(12) United States Patent  (10) Patent No.: US 8,184,141 B2
Caspi et al.  (45) Date of Patent: *May 22, 2012

(54) METHOD AND APPARATUS FOR FACE RECOGNITION ENHANCED VIDEO MIXING

(75) Inventors: Rami Caspi, Sunnyvale, CA (US); William J. Beyda, Cupertino, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1133 days.

This patent is subject to a terminal disclaimer.

(21) Appl. No.: 12/012,622

(22) Filed: Feb. 4, 2008

(65) Prior Publication Data

US 2009/0195638 A1  Aug. 6, 2009

(51) Int. Cl.
 *H04N 7/14* (2006.01)
(52) U.S. Cl. .................. 348/14.01; 709/204
(58) Field of Classification Search .... 348/14.01–14.09, 348/14.11–14.13; 382/118, 248; 358/85; 709/204; 370/260–261; 725/135, 37, 141, 725/106, 115–116
See application file for complete search history.

(56) References Cited

U.S. PATENT DOCUMENTS

| | | | |
|---|---|---|---|
| 5,537,141 A * | 7/1996 | Harper et al. | 725/116 |
| 5,767,897 A * | 6/1998 | Howell | 348/14.07 |
| 6,353,450 B1 * | 3/2002 | DeLeeuw | 715/768 |
| 6,850,266 B1 * | 2/2005 | Trinca | 348/14.09 |
| 7,227,976 B1 * | 6/2007 | Jung et al. | 382/103 |
| 7,746,223 B2 * | 6/2010 | Howarter et al. | 340/506 |
| 2003/0236836 A1 * | 12/2003 | Borthwick | 709/204 |
| 2004/0250201 A1 * | 12/2004 | Caspi | 715/512 |
| 2007/0200925 A1 * | 8/2007 | Kim | 348/14.08 |
| 2008/0030621 A1 * | 2/2008 | Ciudad et al. | 348/586 |
| 2008/0136899 A1 * | 6/2008 | Eisenberg et al. | 348/14.09 |
| 2009/0199078 A1 * | 8/2009 | Caspi et al. | 715/202 |
| 2011/0025818 A1 * | 2/2011 | Gallmeier et al. | 348/14.07 |

* cited by examiner

*Primary Examiner* — Curtis Kuntz
*Assistant Examiner* — Maria El-Zoobi (57) ABSTRACT

A telecommunications system includes a network; a plurality of user devices coupled to the network; a multipoint control unit coupled to the network and configured to supervise multipoint conferencing among the plurality of user devices, the multipoint control unit including a presentation mixer, the presentation mixer configured to remove one or more backgrounds from a presentation and mix a live video feed into the presentation as a substitute background; a screen for displaying a resulting mixed presentation such that a full area of the screen is used to display the mixed presentation; and a feature recognition system configured to identify a party from one or more features displayed on the screen and selectively adjust a transparency of said one or more features other than said party.

20 Claims, 11 Drawing Sheets

METHOD AND APPARATUS FOR FACE RECOGNITION ENHANCED VIDEO MIXING

CROSS REFERENCE TO RELATED APPLICATIONS

This application is related to commonly-assigned, co-pending U.S. patent application Ser. No. 12/012,630, titled "Method and Apparatus for Enhanced Video Mixing," which is hereby incorporated by reference as if fully set forth herein.

BACKGROUND OF THE INVENTION

1. Field of the Invention

This invention relates to telecommunications systems. More particularly, the invention relates to an improved video mixing system for video and/or multimedia conferencing.

2. Description of the Related Art

Videoconferencing technology and applications have been available but have suffered from technical limitations, such as limited bandwidth, CPU load, and low resolution displays, which resulted in annoying tradeoffs between speed, resolution, and performance. Modern videoconferencing systems thus have suffered from low adoption rates due to poor video quality and user experience.

Higher quality ("High definition" or "HD") video conferencing systems are becoming available that employ large screens and higher resolutions, as well as significantly more bandwidth. While such systems are becoming more widely deployed, they too suffer from cost and performance issues.

In a typical videoconferencing environment, it is desirable to display one or more slides or foils of a presentation using a presentation program such as Microsoft PowerPoint, as well as a live video feed showing, for example, current speakers. In some systems, a display may be used for the presentation and another for the speakers. However, physical constraints of a typical conference room (as well as financial constraints) make multiple displays inconvenient in many cases. Consequently, in many systems, a single large screen is provided for showing presentation slides, with the live video feed being displayed in a smaller window using "picture-in-picture" techniques. The smaller picture-in-picture window is relatively difficult to see and eliminates many of the benefits of HD videoconferencing. However, since seeing the slides is usually critical, there is often little choice for the participants.

As such, there is a need for a system that provides the benefits of HD conferencing while accommodating physical and financial constraints of users.

SUMMARY OF THE INVENTION

These and other drawbacks in the prior art are overcome in large part by a system and method according to embodiments of the present invention.

A telecommunications system in accordance with embodiments of the present invention includes a network; a plurality of user devices coupled to the network; a multipoint control unit coupled to the network and configured to supervise multipoint conferencing among the plurality of user devices, the multipoint control unit including a presentation mixer, the presentation mixer configured to remove one or more backgrounds from a presentation and mix a live video feed into the presentation as a substitute background; a screen for displaying a resulting mixed presentation such that a full area of the screen is used to display the mixed presentation; and a feature recognition system configured to identify a party from one or more features displayed on the screen and selectively adjust a transparency of said one or more features other than said party.

A telecommunications system in accordance with embodiments of the present invention includes a collaboration controller; a presentation mixer including a presentation program and configured to receive one or more presentation slides from the collaboration controller, remove one or more backgrounds from said one or more presentation slides and mix a live video feed into the presentation as a substitute background; and a transparency controller configured to adjust a level of transparency of portions of the substitute background.

A telecommunications method in accordance with embodiments of the present invention includes providing a slide presentation on a high definition monitor; providing a live video feed to the high definition monitor; and superimposing the slide presentation over the video feed by replacing a slide presentation background with the video feed and using a predetermined level of transparency of portions of the video feed.

A telecommunications method, in accordance with embodiments of the present invention includes receiving a presentation file at a conferencing service; receiving one or more participant video feeds at the conferencing service from one or more conference participants; mixing the one or more participant video feeds with the presentation file by providing a mixed video feed as a background for the presentation corresponding to the presentation file; and selectively adjusting the transparency of portions of the mixed video feed background.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION OF EMBODIMENTS OF THE INVENTION

Figure 1:
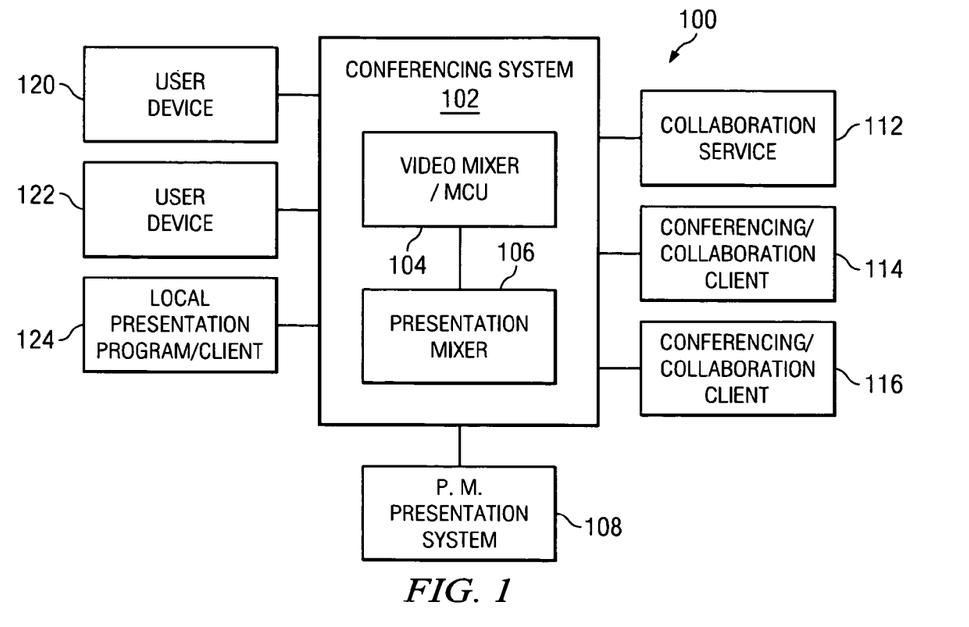
FIG. 1 illustrates an exemplary system according to embodiments of the present invention.

Turning now to the drawings and, with particular attention to FIG. 1, a diagram of a telecommunications system 100 according to an embodiment of the present invention is shown.

The system 100 includes a conferencing service or unit 102 including, coupled to, or in communication with, a multipoint control unit/mixer 104 and a presentation mixer 106 in accordance with embodiments of the present invention. In some embodiments, the conferencing service 102 may include, be coupled to, or be in communication with a collaboration service or program 112. In addition, the conferencing service or control unit 102 may be, include, or be in communication with a presentation program or control unit 108, as will be explained in greater detail below. In certain embodiments, the conferencing service 102 may be implemented as personal computers or servers operating as World Wide Web Internet or intranet servers.

The conferencing control unit 102 may be in communication with one or more collaboration clients or client programs 114, conferencing clients or client programs 116, and presentation clients or client programs 124, as will be explained in greater detail below. It is noted that, in some embodiments, the collaboration client 114, the conferencing client 116, and the presentation client 124 are integrated into a single client suite. Thus, the figures are exemplary only.

User devices, such as user devices 120, 122 may be connected to or in communication with the conferencing service 102 and various clients and services. In certain embodiments, the user devices 120, 122 may be implemented as telephones, cellular telephones, PDAs, PocketPCs, computers, etc. For example, user devices 120, 122 may be embodied as personal computers implementing the Windows XP or Vista operating system and a web browser, respectively, such as the Microsoft Explorer or Mozilla Firefox web browser. In some embodiments, the user devices 120, 122 may implement one or more of the various clients or client programs.

The conferencing service 102 and its components, as well as the other services and clients, may be implemented in hardware and/or software operating on one or more servers, computer systems, host or mainframe computers, workstations, etc. In some embodiments, the conferencing service 102, as well as the other services and clients 108, 110, 112, 114, 116, 124 may be operating on some or all of the same devices as other components in the system 100.

A conferencing and collaboration system, including a conferencing and collaboration system and conferencing and conferencing clients, that may suitably be modified for use in embodiments of the present invention is the Openscape system, available from Siemens Comm., Inc. Multipoint control units that may be suitably modified are available from a variety of vendors such as Cisco. A variety of presentation programs may be used for the presentation service and clients and in conjunction with the present invention, including, for example, Microsoft Office Powerpoint or Apple Keynote.

As will be discussed in greater detail below, a party may use his user device 120,122 to schedule a conference using a conferencing client 116 and upload a presentation from his presentation client 124 to the presentation service 108 and/or the collaboration service 112. The presentation mixer 106 will then receive the presentation and operate in conjunction with the presentation program 108 to remove the background (if any) from the presentation and insert the video feed for the conference as the presentation background. The resulting mixed feed will then be supplied to the conferencing parties via the MCU 104.

In certain embodiments, the system 100 may also include other hardware and/or software components (e.g., gateways, proxy servers, registration server, presence servers, redirect servers, databases, applications, etc.) such as, for example, hardware and software used to support a SIP (Session Initiation Protocol) or other protocol based infrastructure for the system 100 and allow the registration of SIP devices in the system 100.

In certain embodiments of the present invention, one or more of the components of the system 100 may be connected to or in communication with each other via a communication network. For example, turning now to FIG. 2, a system 150 including the components of the system 100 is illustrated, wherein some or all of the components are in communication via a network 152. The network 152 may be or include the Internet, World Wide Web, a local area network, or some other public or private computer, cable, telephone, client/server, peer-to-peer, or communication network or intranet.

Figure 2:
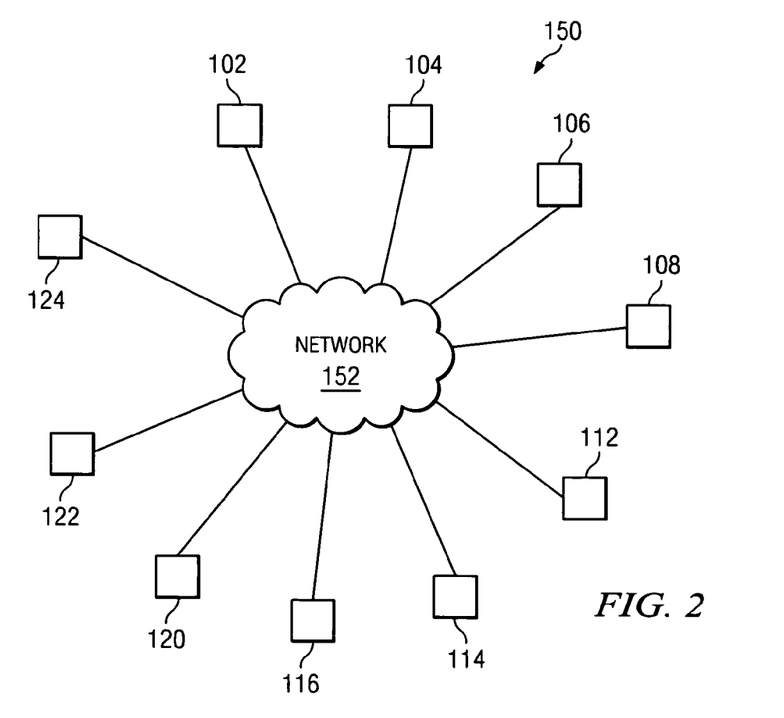
FIG. 2 illustrates an exemplary system according to embodiments of the present invention.

In some embodiments, the communication network can also include other public and/or private wide area networks, local area networks, wireless networks, data communications networks, or connections, intranets, routers, satellite links, microwave links, cellular or telephone networks, radio links, fiber optic transmission lines, ISDN lines, T1 lines, DSL connections, the public switched telephone network (PSTN), etc. Moreover, as used herein, communications include those enabled by wired or wireless technology. In some embodiments, some or all of the network 152 may be implemented using a TCP/IP network and may implement voice or multimedia over IP using, for example, the Session Initiation Protocol (SIP).

Figure 3:
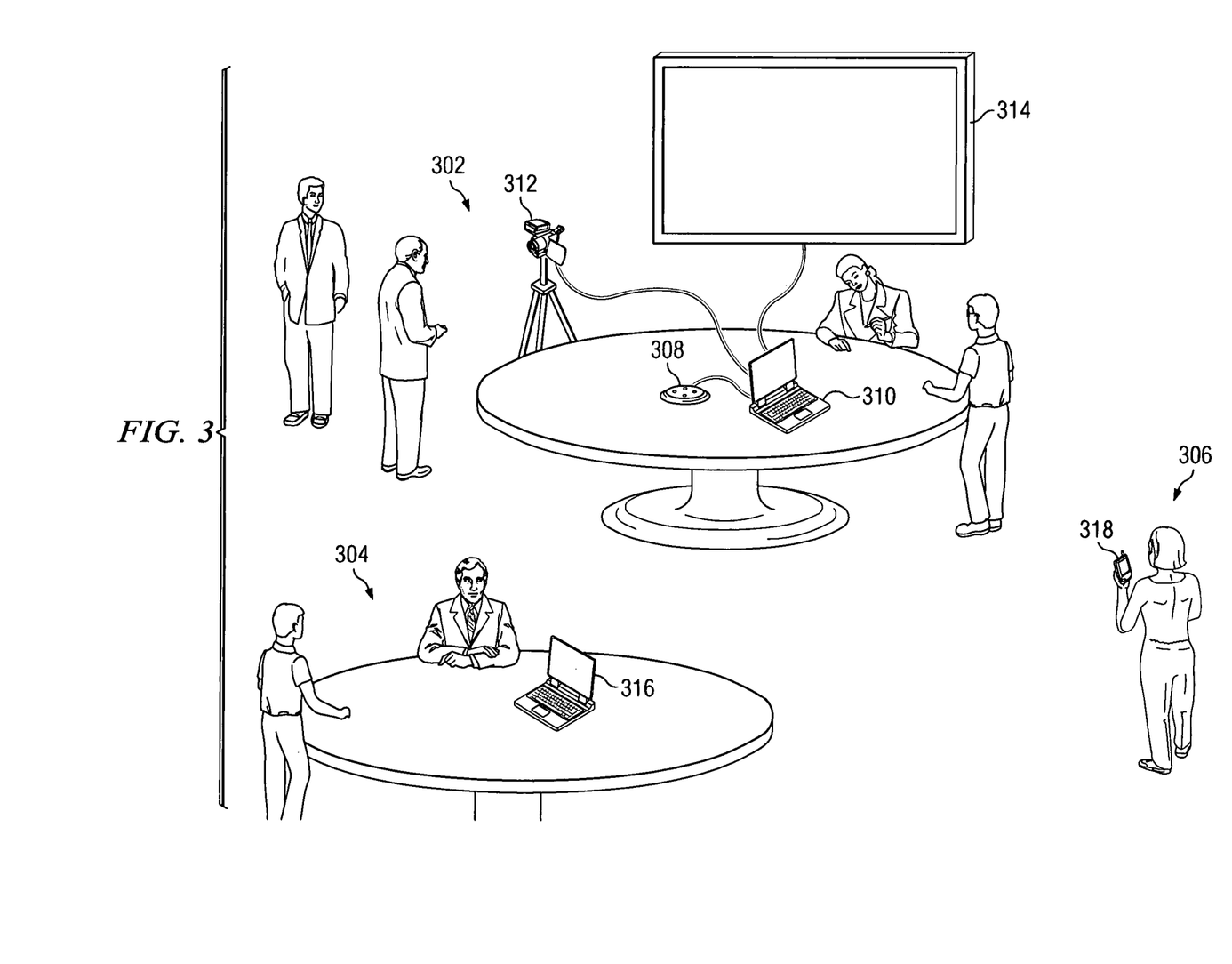
FIG. 3 illustrates an exemplary operating environment for a system according to embodiments of the present invention.

FIG. 3 illustrates an exemplary operating environment for a system in accordance with embodiments of the present invention. In particular, shown are user sites 302, 304, 306. User site 302 may be representative of, for example, an enterprise's conference room, and may include a user device 310 equipped for multimedia conferencing in accordance with embodiments of the present invention and coupled to or including a camera 312 and a speaker-microphone system 308. The speaker-microphone system 308 may, for example, be implemented as a conferencing telephone in communication with the conferencing device 310. Alternatively, the speaker-microphone may be an independent speaker and microphone that attach to or make use of the user device's audio processing system. The conferencing device 310 couples to or includes a monitor, television, or screen 314 for displaying conference images, video feed, etc. In some embodiments, the monitor or screen may be implemented as a high definition (HD) device or HDTV capable of receiving a high definition video feed, as will be discussed in greater detail below. It is noted that, while a separate HDTV monitor or screen 314 is shown, in practice, the computer or user device's own display or monitor may be employed.

The various devices in the conference room of site 302 may be in communication via a wired or wireless local area network (LAN) or by wired or wireless ad hoc networking techniques, such as USB or Firewire cabling or Bluetooth wireless communication. The conferencing device 310 may be implemented, for example, as a personal computer and may interface the system to the public telecommunications network or other networks via one or more gateways/firewalls, etc. (not shown).

Users at site 302 may be in communication in a video or multimedia conference with users at other sites 304, 306. As shown, site 306 includes a conferencing device 316, such as a suitably equipped personal computer. Site 306 includes a user with a suitably equipped cellular telephone 318 or other device. Typically, the user devices 310, 316, 318 implement suitable conferencing clients in accordance with embodiments of the present invention. It is noted, however, that not all devices in the system need be capable of receiving the mixed presentation-video feed in accordance with the present invention. Thus, for example, while a conference may include one or more sites such as 302 that are capable, it can include one or more sites that are not. Such sites may receive unmixed video and presentation feeds or only portions as they are capable of receiving.

In operation, as will be described in greater detail below, users at the sites 302, 304, 306 may communicate via a conferencing service (FIG. 1) for suitably mixing presentation slides and video feeds for display on various high (or low) definition monitors, screens, or display devices. For example, communications and signaling may be via a browser-type interface using one or more Web communications protocols. In some embodiments, the background video feed may have user selectable transparency. That is, the brightness and other features of the video feed related to the degree of transparency is user adjustable so as to allow selective viewing.

Figure 4A:
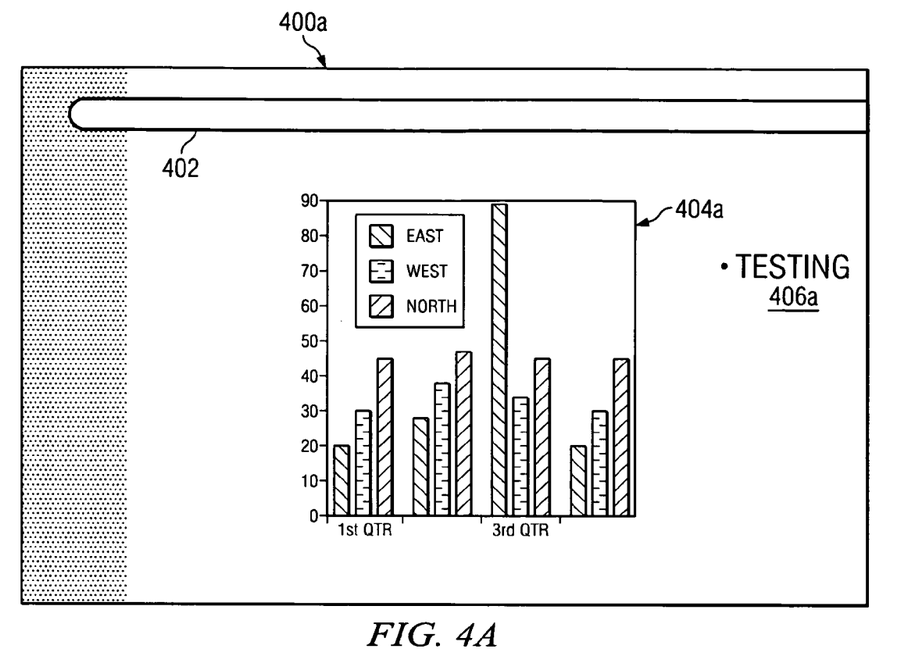
FIG. 4A and FIG. 4B illustrate exemplary presentation handling according to embodiments of the present invention.
Figure 4B:
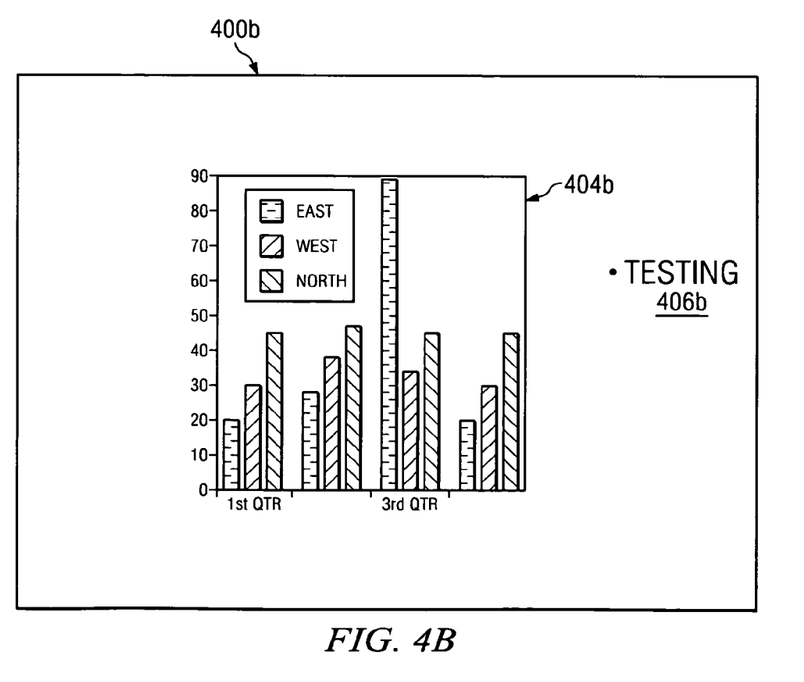

For example, turning now to FIG. 4A and FIG. 4B, shown are exemplary slides representative of, for example, a user presentation. In particular, FIG. 4A illustrates a slide or foil 400*a* including a background 402 and a graphic or image 404*a*, as well as text 406*a*. The background 402 is typically one of several template backgrounds that may be selected and inserted into the presentation in a presentation editing mode.

The background element 402 may be removed, as shown in FIG. 4B, which illustrates slide or foil 400*b*. Slide 400*b* illustrates a graphic 404*b* and text 406*b*, which may be the same as shown in FIG. 4A, and no background.

Figure 5A:
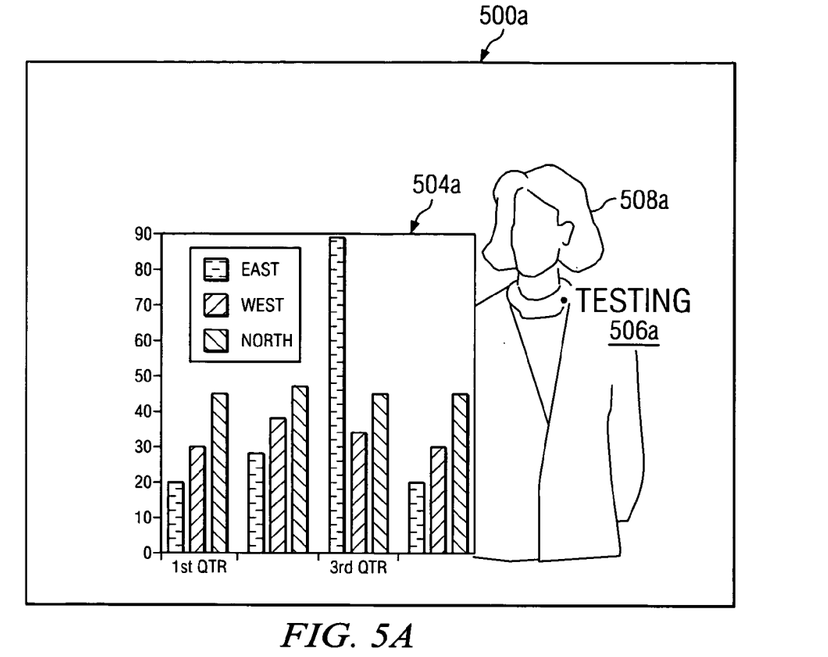
FIG. 5A and FIG. 5B illustrate exemplary presentation handling according to embodiments of the present invention.
Figure 5B:
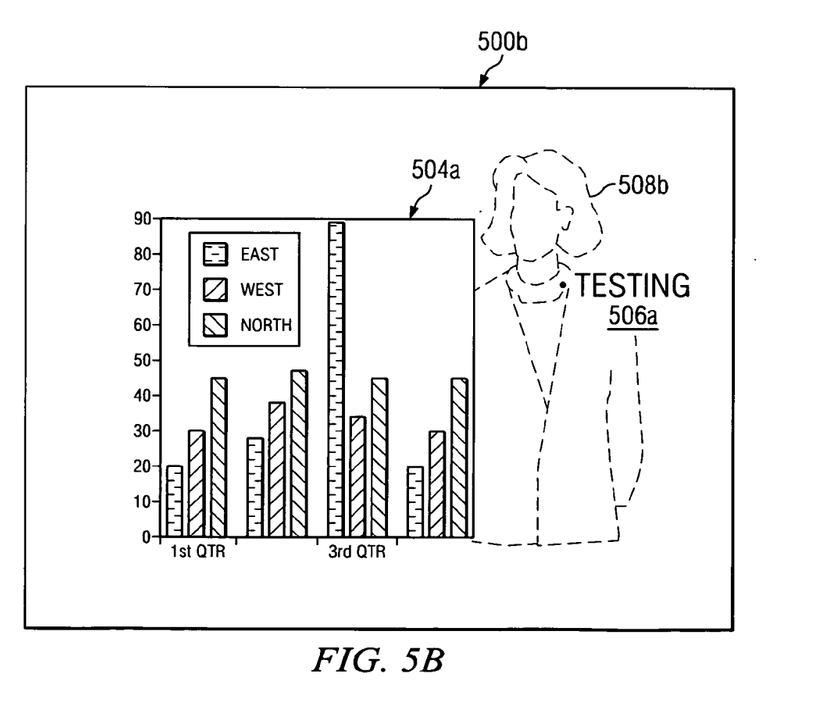

As shown in FIG. 5A and FIG. 5B, in accordance with embodiments of the present invention, the static background is replaced with a video feed whose transparency can be adjusted. For example, FIG. 5A illustrates slide 500*a* including graphic 504*a* and text 506*a*. A video feed 508*a* is used as the slide background, replacing the traditional background shown in FIG. 4A. Thus, the slide content is superimposed over the video feed.

Further, as noted above, the transparency (or alternatively, the opacity) of the background is adjustable. Shown in FIG. 5B is the slide superimposed over a video feed 508*b*. As can be seen, and as will be explained in greater detail below, the user can adjust the transparency of the background video so as to improve viewing of the slide details.

In some embodiments, the control may be of the actual feed being received; in other embodiments, it may be merely a localized processing or adjustment of the video feed. That is, in some embodiments, the feed itself is adjusted at the service source; in other embodiment, it is adjusted at the local client or clients.

Figure 6:
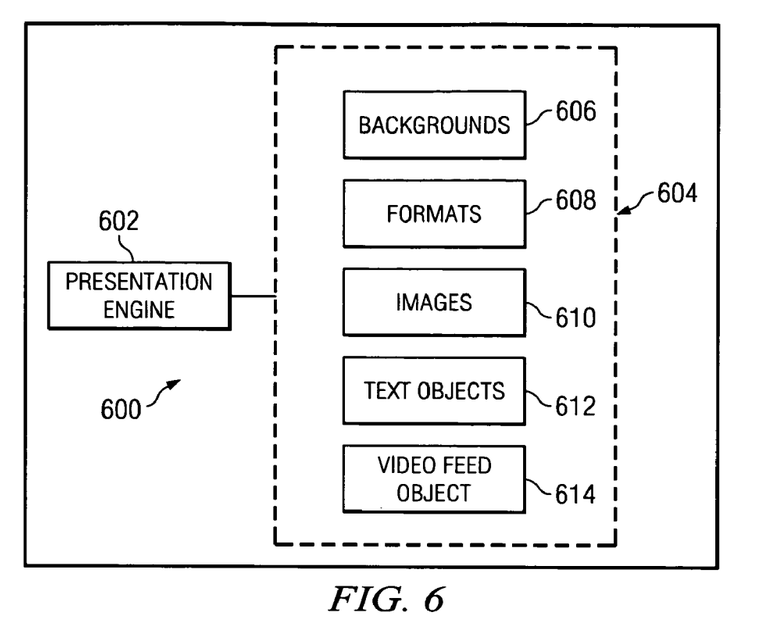
FIG. 6 illustrates an exemplary embodiment of the present invention.

Turning now to FIG. 6, a presentation system 600 for deleting background and inserting a video feed is shown. The presentation system 600 is representative of, for example, the presentation program 108 and/or clients 124 of FIG. 1.

Shown is a presentation engine 602, which may implement the main body of the presentation program. The presentation engine 602 may interact with one or more APIs, libraries, or control elements 604. These may include a background control element or library 606, a slide formats control element or library 608, an images control element or library 610, a text objects control element or library 612, and a video feed control element or library 614 in accordance with embodiments of the present invention.

In operation, a user can use, for example, a client version of the presentation program 600 to construct, edit, or receive a slide presentation. The presentation service version of the presentation program 600 can receive the presentation from the client (or other source). In particular, the presentation engine 602 receives a presentation from a client device and determines if there is a background, for example, by identifying the appropriate background control element 606. If so, the background is removed and a video feed object controlled by or associated with the video feed control element 614 replaces it. The presentation program 600 thus knows that a video feed is to be received and mixed. The video feed is then received, and the mixed presentation-background video feed is provided to the client device, whose client presentation program displays the feed with the video background (which is identified by the video feed object 614).

Figure 7:
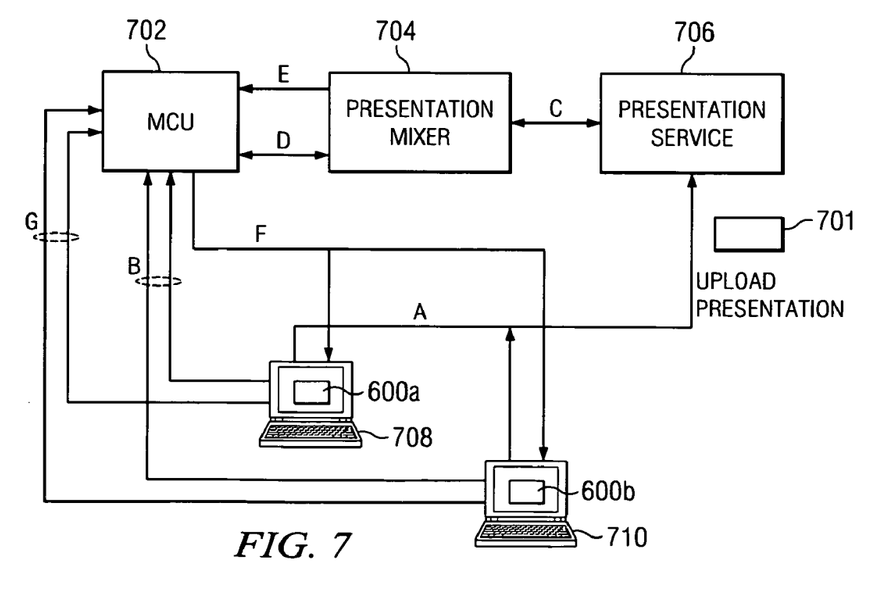
FIG. 7 illustrates exemplary signaling for an embodiment of the present invention.

Turning now to FIG. 7, a diagram schematically illustrating operation of an embodiment of the present invention is shown. Shown are a MCU or mixer 702, a presentation mixer 706, and a presentation program/service 708. Also shown are user devices 708, 710, which may implement local conferencing systems or conferencing capable personal computers.

Initially, users of the personal computers 708, 710 can generate or otherwise receive one or more presentations associated with a local presentation program 600*a*, 600*b*. At A, users of the personal computers 708, 710 can upload one or more presentation files 701 to the presentation service 706. For example, the presentations may be transmitted via a protocol such as FTP or HTTP, or may be transmitted as an attachment to an e-mail or other manner. The presentations can be provided to the system at any time, so long as some identification with the appropriate conference is indicated. It is noted that, in some embodiments, the presentation is first uploaded to the collaboration or conferencing services, and then is provided to the presentation service for suitable manipulation. The presentation service 706 then removes the background and readies the presentation to receive the mixed video feed, for example, by using or inserting the video feed object 614 (FIG. 6).

At B, the users can join the conference using their conferencing clients and transmit their video feeds to the MCU 702. The video feeds are mixed at the MCU 702, for example, in a known manner. The presentation service 706 can provide the presentation to the presentation mixer 704 at C. Similarly, the mixed video feed from the MCU 702 is provided to the presentation mixer 704 at D. Once mixed, the resulting presentation video feed is provided back to the MCU 702 at E for transmission to the party participants, at F. Control signaling may be provided over the conference setup channel at B or on a separate channel at G. Such control signaling can include, for example, background video feed transparency control.

Figure 8:
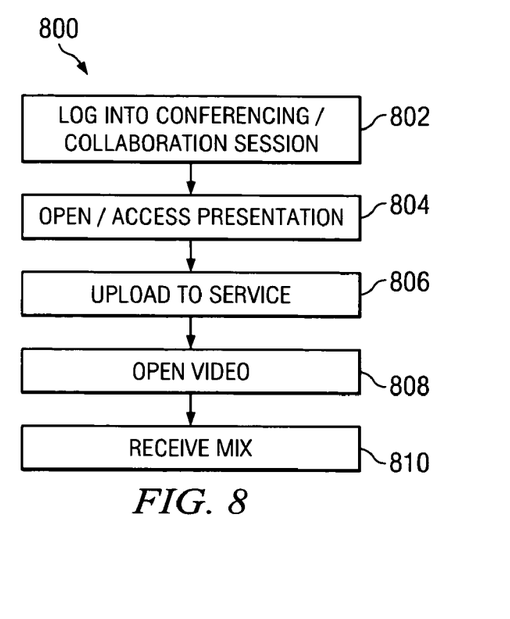
FIG. 8 is a flowchart illustrating operation of an embodiment of the present invention.

FIG. 8 illustrates a flowchart 800 of an embodiment of the present invention. The particular arrangement of elements in the flowchart 800 is not meant to imply a fixed order to the elements; embodiments can be practiced in any order that is practicable. In particular, FIG. 8 illustrates operation from the client point of view.

Initially, in a process step 802, a user can log in to a conference or collaboration session using his collaboration or conferencing software package/suite. As noted above, in some embodiments, the software suite is based on the Siemens Openscape system. In a process step 804, he can open or otherwise access his presentation file. For example, he can open his presentation program, such as Microsoft PowerPoint, and open the appropriate file corresponding to the presentation. In a process step 806, he can upload the presentation to the presentation server associated with the system. It is noted that, in some embodiments, uploading a presentation does not require opening it in the presentation program. In a process step 808, the user can open his video stream to the service for the conference. Finally, in a process step 810, the incoming video streams are mixed in with the presentation and provided to the conference participants on a video screen or monitor. The conferencing clients and presentation clients can identify the presence of the background video feed, for example, by identifying the video feed object. In addition, in some embodiments, the system may be informed that the user has a suitable HDTV monitor or conferencing setup prior to the background mixing.

Figure 9:
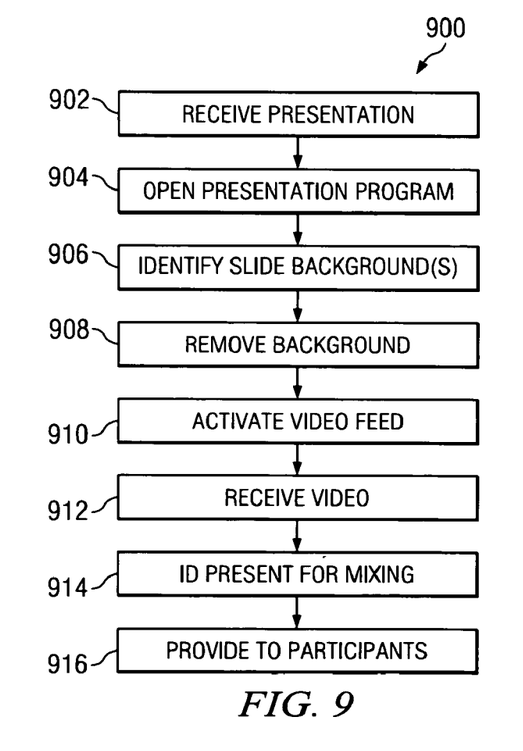
FIG. 9 is a flowchart illustrating operation of an embodiment of the present invention.

FIG. 9 illustrates a flowchart 900 of an embodiment of the present invention. In particular, FIG. 9 illustrates a flow of operation as seen at the presentation/mixing service. The particular arrangement of elements in the flowchart 900 is not meant to imply a fixed order to the elements; embodiments can be practiced in any order that is practicable.

In a step 902, the presentation service 108 can receive the presentation or presentations from conference participants. In a step 904, in response to receiving the presentation, the presentation program 108 opens the presentation. In some embodiments, the opening can be automatic upon identification of the file as a presentation file. In other embodiments, the user can transmit one or more control signals either prior to or after transmitting the presentation file that inform the system that the mixing is to proceed. In a step 906, the presentation program 108 identifies that a video feed is to be mixed in as the slide background and identifies the background of the individual slides. Alternatively, the presentation program 108 may be informed of this by the collaboration service 112. In a process step 908, the presentation program 108 removes the presentation backgrounds from the presentation. In some embodiments, a video feed object may be inserted.

In a process step 910, the mixer 104 activates and receives the video feed(s). In a process step 912, the presentation mixer 106 identifies that a presentation exists for mixing. In a process step 914, the presentation mixer 106 mixes the received video feed(s) and the presentation into the outgoing video. Finally, in a process step 916, the mixed video/presentation is provided to the parties.

Figure 10:
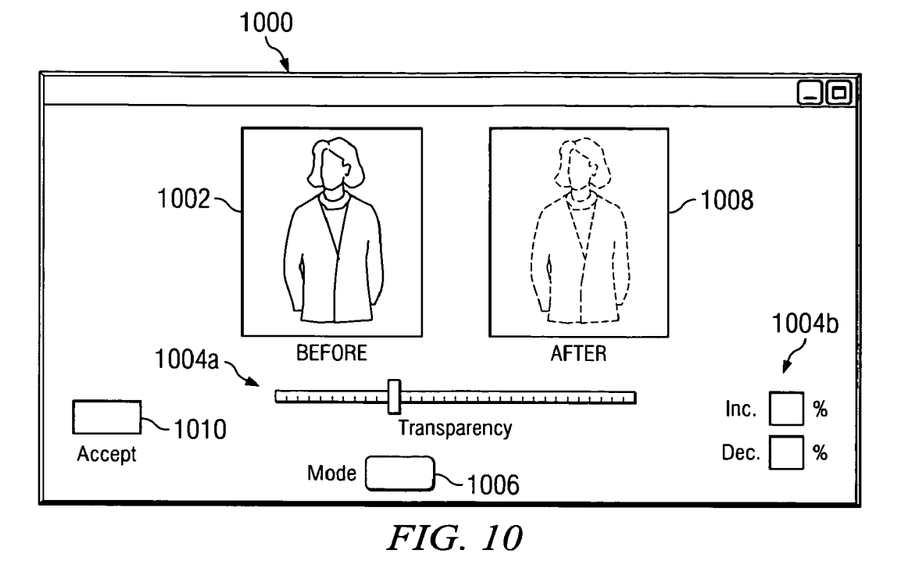
FIG. 10 is a diagram of an exemplary graphical user interface for operation in accordance with embodiments of the present invention.

As discussed above, in some embodiments of the present invention, a user may selectively control the transparency of the presentation background video feed. Turning now to FIG. 10, a diagram illustrating an exemplary graphical user interface for use with an embodiment of the present invention is shown. In particular, shown is a GUI 1000 that may represent a control window that may be accessible via a conferencing or collaboration system client interface (not shown). In the example illustrated, a "Before" window 1002 is provided, which can show what the current level of transparency on the actual image. One or more controls, such as a "slide" 1004a and Increase/Decrease entry fields 1004b may be provided for entering or adjusting the transparency. It is noted that other controls may be provided. An "After" window 1008 may also be provided for viewing the results of the adjustment. If the change is acceptable, the user can select the "Accept" control 1010, which will cause the system to implement the change.

In some embodiments, operation of the GUI 1000 will cause appropriate control signaling to the conferencing service, which will implement the change at an associated transparency controller in or in communication with the presentation mixer prior to mixing. In other embodiments, the local conferencing client implements the changes only locally at a local transparency controller. That is, the "transparency effect" may be implemented on the individual video feed, either prior to mixing at the service or after it is received at the client (and responsive, in both cases to appropriate controls and detection of the corresponding video feed object). Such a technique will be discussed in greater detail below.

As noted above, embodiments of the present invention permit a presentation background to be replaced by a video feed. As can be appreciated, if the background of the video feed is too "busy," it can distract from the content of the presentation itself. Consequently, embodiments of the present invention allow for selective transparency of the entirety of the video feed, as discussed above, and for portions of the video feed, as will be discussed in greater detail below.

In particular, some embodiments of the present invention provide for facial or feature recognition. The identified face can then be "highlighted" or rendered less transparent, i.e., more visible, while the remainder of the video feed is more obscured. Thus, in some embodiments, the GUI 1000 of FIG. 10 includes a "speaker mode" control 1006 whose activation allows for identifying and relatively highlighting the faces of conference participants in the video feed. In some embodiments, only the face of the current speaker is so highlighted. A system and method for identifying a speaker is shown in commonly assigned, co-pending U.S. patent application Ser. No. 11/904,651 titled, "Method and Apparatus for Identifying Conference Call Participants," filed Sep. 27, 2007, which is hereby incorporated by reference in its entirety as if fully set forth herein.

Figure 11A:
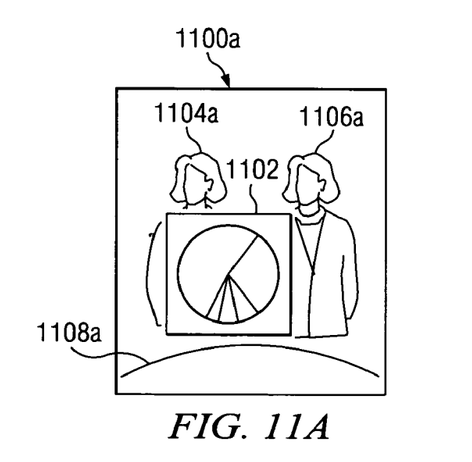
FIG. 11 is a diagram illustrating operation of exemplary embodiments of the present invention.

For example, turning now to FIG. 11A, a diagram of an exemplary presentation screen in accordance with embodiments of the present invention is shown. Shown is a screen 1100a including one or more presentation elements 1102. Such elements can include, for example, graphical or text elements, images, and the like. A background video feed in accordance with embodiments of the present invention is also shown and includes a participant 1104a and a participant 1106a and additional element, such as a conference table 1108a.

Figure 11B:
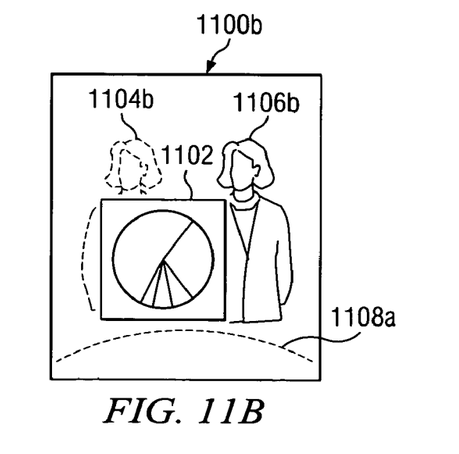

In operation, face or feature recognition techniques are employed to identify a face, such as the faces of participants, and can include, for example, identifying speakers and non-speakers. Any suitable face recognition technique, such as those used for security and biometric identification purposes, may be employed. The faces of speakers (or all participants) can then be displayed in a more "solid" or less transparent fashion than the rest of the video feed, as shown in FIG. 11B. In particular, shown in FIG. 11B is a presentation screen 1100b including presentation element 1102 and participants 1104b and 1106b. In the example illustrated, participant 104b is more transparent than participant 1106b. Element 1106b is also more transparent. It is noted that in some embodiments, all elements other than participants may be adjusted to be more transparent. Thus, the figure is exemplary only.

The facial or feature recognition technique for partial transparency may be implemented either purely locally or at the presentation service itself, as with the "total" transparency implementation described above.

As can be appreciated, analysis of the entire mixed video feed-presentation feed may not result in the best face detection, depending on the technique used. Consequently, in some embodiments, rather than performing a face detection on the entire video feed-presentation mixed feed, the face recognition is performed only on the background video feed. Thus, the video feed is "extracted" from the mixed presentation video, i.e., analyzed separately after identifying it from the video feed object. This is similar to the technique used to identify the background video feed from the mixed feed for the "whole" transparency technique discussed above. Again, depending on the implementation, this may occur either at the received party presentation software or at the service prior to mixing the video feed with the presentation as its background. Further, it is noted that the background and presentation need not be physically separated, just analyzed separately.

Figure 12A:
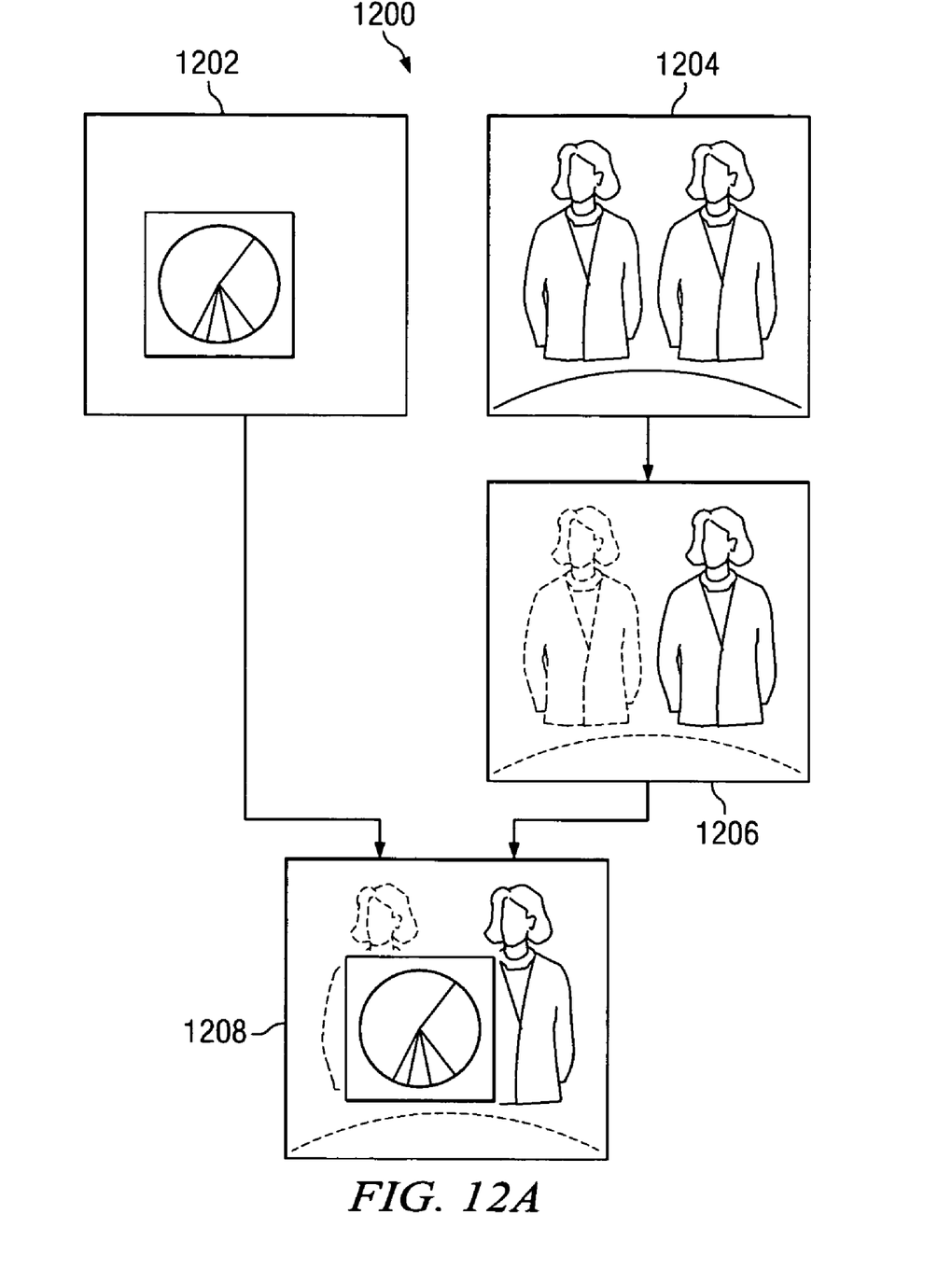
FIG. 12A and FIG. 12B schematically illustrate operation of exemplary embodiments of the present invention.
Figure 12B:
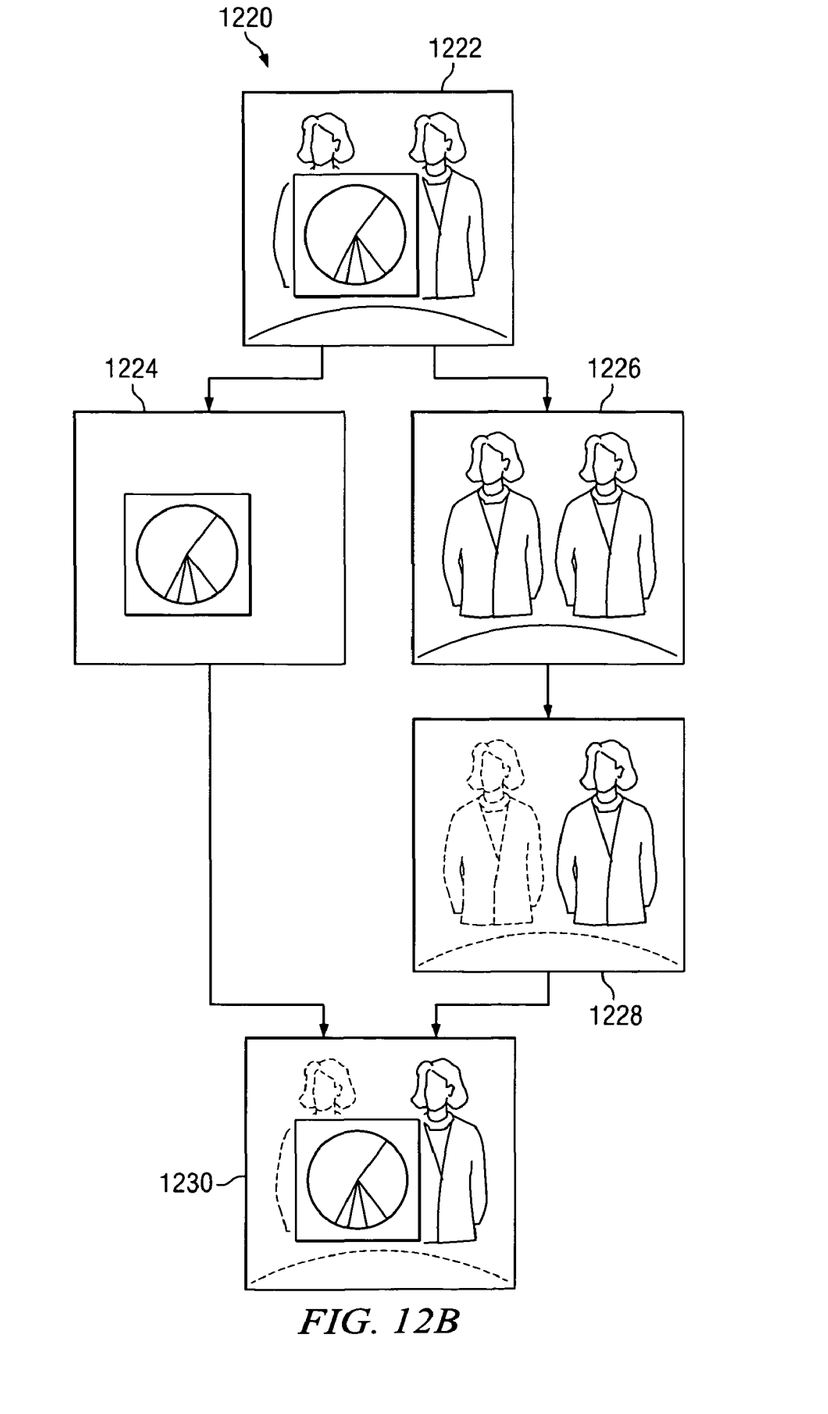

This is illustrated generally in FIG. 12A and FIG. 12B. Turning now to FIG. 12A, a diagram 1200 schematically illustrating a pre-mixing technique is shown. Such a technique may be implemented, for example, at the presentation service. Shown at 1202 is an exemplary presentation. Shown at 1204 is an exemplary video feed. At 1206, the video feed is analyzed and the speaker identified. The remainder of the video feed is made more transparent, as denoted by the dotted lines. At 1208, the selectively transparent video feed and the presentation are mixed for viewing.

FIG. 12B is a diagram 1220 illustrating a post-mixed analysis. Shown is a presentation 1222 having a presentation and a mixed video feed background. In response to suitable user signals, the video feed background 1226 is identified and "separated" from the presentation 1224. At 1228, the transparency analysis is performed on the video feed. At 1230, the adjusted video feed and the presentation are (at least logically) "re-mixed."

Figure 13:
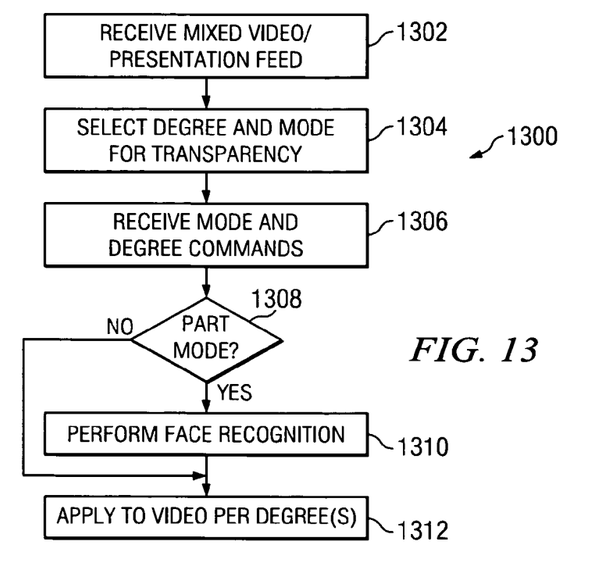
FIG. 13 is a flowchart illustrating operation of an embodiment of the present invention.

FIG. 13 illustrates a flowchart 1300 of an embodiment of the present invention. The particular arrangement of elements in the flowchart 1300 is not meant to imply a fixed order to the elements; embodiments can be practiced in any order that is practicable.

In a process step 1302, the mixed video-presentation feed according to embodiments of the present invention is received at one or more local clients. In a process step 1304, the participant can use his graphical user interface to select a degree and/or a mode for the transparency of the background video. In a process step 1306, the commands are received at the appropriate control entity, i.e., a client or the service.

In a process step 1308, if it is determined that the mode is the partial or participant mode, then in a step 1310, the system will perform face recognition. As discussed above, the face recognition could be performed on the entire mixed feed or simply on the video feed. Likewise, it can occur either purely locally or at the service. In a process step 1312, the appropriate transparency can be applied to the desired portions of the feed.

Figure 14:
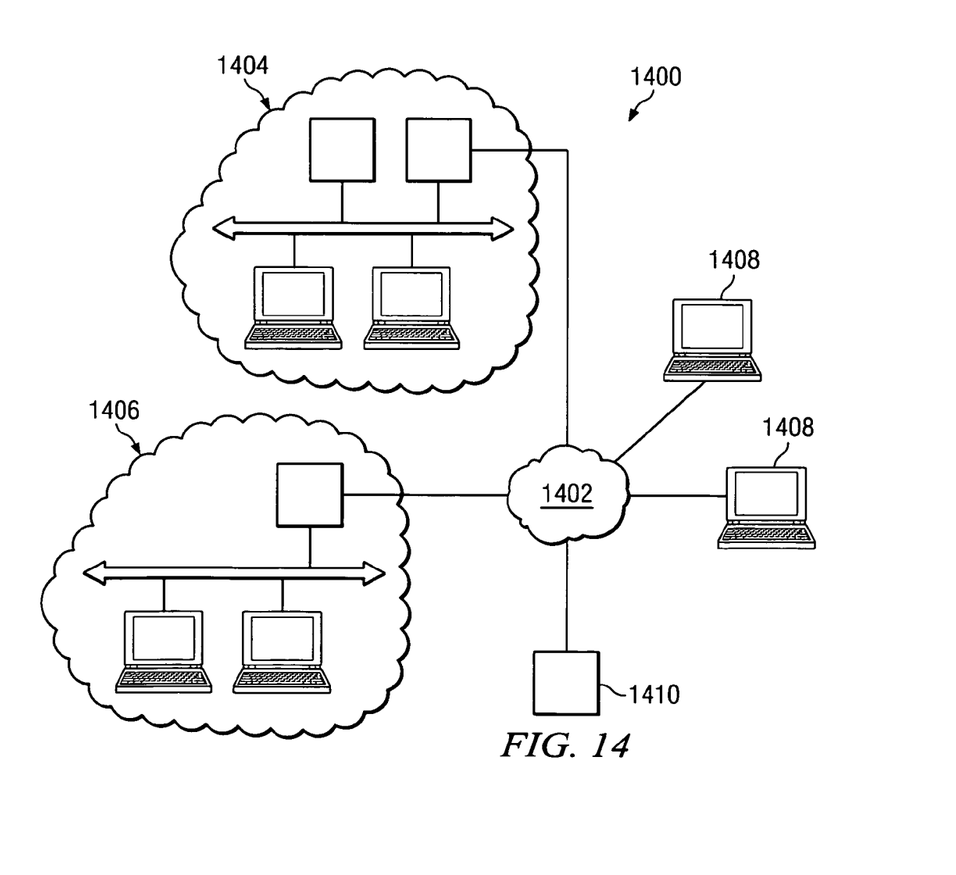
FIG. 14 is a diagram of an exemplary network configuration in accordance with embodiments of the present invention.

FIG. 14 illustrates a particular exemplary network configuration of a system in accordance with embodiments of the present invention. In particular, shown in FIG. 14 is a network system 1400 including a network 1402. Network 1402 may be embodied, for example, as any suitable network capable of providing mixed media services, such as a pubic network such as the Internet or public telephone network, or combinations thereof.

One or more local area networks 1404, 1406 and individual subscribers 1408 may couple to the network 1402. The local area networks may be associated, for example, with one or more business entities or other enterprises. Individual subscribers 1408 may be private individuals who access the presentation/conferencing service.

In addition, a service provider may implement a conferencing and/or collaboration service 1410 including mixers in accordance with embodiments of the present invention. The local area networks may couple to the network via one or more network gateways and may implement conferencing locally.

Figure 15:
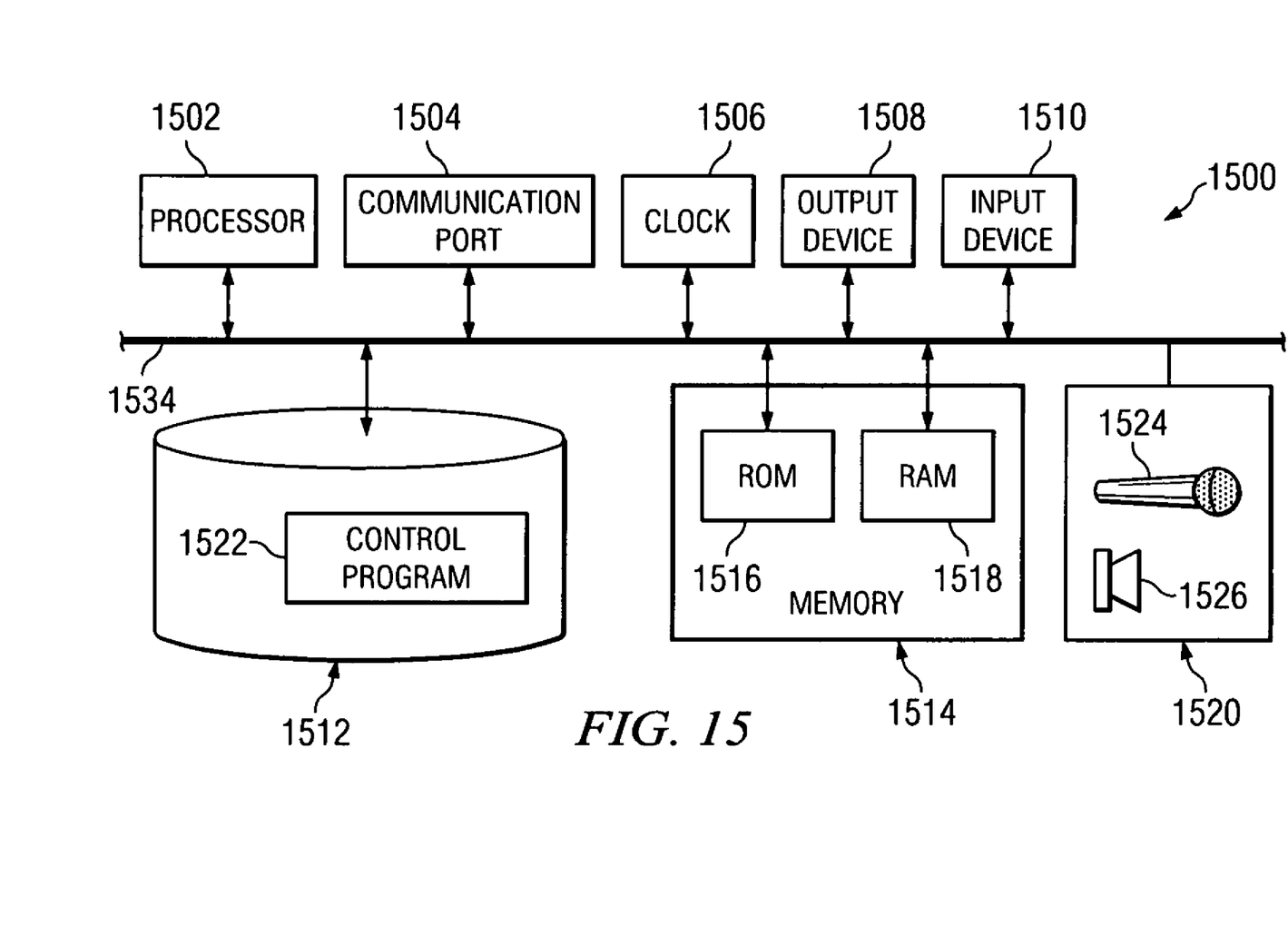
FIG. 15 is a diagram of an exemplary user device in accordance with embodiments of the present invention.

Now referring to FIG. 15, a representative block diagram of an exemplary computer or processing device 1500 suitable for use as a user device or a server according to embodiments of the present invention is shown. In particular, the computer 1500 may be a device suitable for accessing or implementing a service or clients in accordance with embodiments of the present invention. In some embodiments, the computer 1500 may include or operate a web browser or conferencing system or clients. The computer 1500 may be embodied as a single device or computer, a networked set or group of devices or computers, a workstation, mainframe or host computer, etc. In some embodiments, the computer 1500 may implement one or more elements of the methods disclosed herein.

This is illustrated generally in FIG. 12A and FIG. 12B. Turning now to FIG. 12A, a diagram 1200 schematically illustrating a pre-mixing technique is shown. Such a technique may be implemented, for example, at the presentation service. Shown at 1202 is an exemplary presentation. Shown at 1204 is an exemplary video feed. At 1206, the video feed is analyzed and the speaker identified. The remainder of the video feed is made more transparent, as denoted by the dotted lines. At 1208, the selectively transparent video feed and the presentation are mixed for viewing.

FIG. 12B is a diagram 1220 illustrating a post-mixed analysis. Shown is a presentation 1222 having a presentation and a mixed video feed background. In response to suitable user signals, the video feed background 1226 is identified and "separated" from the presentation 1224. At 1228, the transparency analysis is performed on the video feed. At 1230, the adjusted video feed and the presentation are (at least logically) "re-mixed."

FIG. 13 illustrates a flowchart 1300 of an embodiment of the present invention. The particular arrangement of elements in the flowchart 1300 is not meant to imply a fixed order to the elements; embodiments can be practiced in any order that is practicable.

In a process step 1302, the mixed video-presentation feed according to embodiments of the present invention is received at one or more local clients. In a process step 1304, the participant can use his graphical user interface to select a degree and/or a mode for the transparency of the background video. In a process step 1306, the commands are received at the appropriate control entity, i.e., a client or the service.

In a process step 1308, if it is determined that the mode is the partial or participant mode, then in a step 1310, the system will perform face recognition. As discussed above, the face recognition could be performed on the entire mixed feed or simply on the video feed. Likewise, it can occur either purely locally or at the service. In a process step 1312, the appropriate transparency can be applied to the desired portions of the feed.

FIG. 14 illustrates a particular exemplary network configuration of a system in accordance with embodiments of the present invention. In particular, shown in FIG. 14 is a network system 1400 including a network 1402. Network 1402 may be embodied, for example, as any suitable network capable of providing mixed media services, such as a pubic network such as the Internet or public telephone network, or combinations thereof.

One or more local area networks 1404, 1406 and individual subscribers 1408 may couple to the network 1402. The local area networks may be associated, for example, with one or more business entities or other enterprises. Individual subscribers 1408 may be private individuals who access the presentation/conferencing service.

In addition, a service provider may implement a conferencing and/or collaboration service 1410 including mixers in accordance with embodiments of the present invention. The local area networks may couple to the network via one or more network gateways and may implement conferencing locally.

Now referring to FIG. 15, a representative block diagram of an exemplary computer or processing device 1500 suitable for use as a user device or a server according to embodiments of the present invention is shown. In particular, the computer 1500 may be a device suitable for accessing or implementing a service or clients in accordance with embodiments of the present invention. In some embodiments, the computer 1500 may include or operate a web browser or conferencing system or clients. The computer 1500 may be embodied as a single device or computer, a networked set or group of devices or computers, a workstation, mainframe or host computer, etc. In some embodiments, the computer 1500 may implement one or more elements of the methods disclosed herein.

The computer 1500 may include a processor, microchip, central processing unit, or computer 1502 that is in communication with or otherwise uses or includes one or more communication ports or network interfaces 1504 for communicating with user devices and/or other devices. The communication ports 1504 may include such things as telephone adapters, local area network adapters, wireless communication devices, Bluetooth technology, etc. The computer 1500 also may include an internal clock element 1506 to maintain an accurate time and date for the computer 1500, create time stamps for communications received or sent by the computer 1500, etc.

If desired, the computer 1500 may include one or more output devices 1508 such as a printer, infrared or other transmitter, antenna, display screen or monitor, text to speech converter, speaker, etc., as well as one or more input devices 1510 such as a bar code reader or other optical scanner, infrared or other receiver, antenna, magnetic stripe reader, image scanner, roller ball, touch pad, joystick, touch screen, computer keyboard, computer mouse, microphone, etc. In some embodiments, the computer 1500 may include a telephony interface 1520 including, for example, a microphone 1524 and speaker 1526.

In addition to the above, the computer 1500 may include a memory or data storage device 1512 to store information, software, databases, documents, communications, device drivers, etc. The memory or data storage device 1512 may be implemented as an appropriate combination of magnetic, optical and/or semiconductor memory, and may include, for example, Read-Only Memory (ROM), Random Access Memory (RAM), a tape drive, flash memory, a floppy disk drive, a Zip™ disk drive, an optical disk such as a compact disc or DVD and/or a hard disk. Thus, the storage device 1512 may include various combinations of moveable and fixed storage. The computer 1500 also may include memory 1514, such as ROM 1516 and RAM 1508.

The processor 1502 and the data storage device 1512 in the computer 1500 each may be, for example: (i) located entirely within a single computer or other computing device; or (ii) connected to each other by a remote communication medium, such as a serial port cable, telephone line or radio frequency transceiver. In one embodiment, the computer 1500 may be implemented as one or more computers that are connected to a remote server computer, as will be explained in greater detail below.

A conventional personal computer or workstation with sufficient memory and processing capability may be used as the computer 1500. The computer 1500 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 1502. Other suitable processors may be available from Motorola, Inc., AMD, or Sun Microsystems, Inc. The processor 1502 also may be embodied as one or more microprocessors, computers, computer systems, etc.

Software may be resident and operating or operational on the computer 1500. The software may be stored on the data storage device 1512 and may include one or more control programs 1522. The control programs 1522 may implement the various services and clients described herein.

It is noted that, while illustrated as software stored in storage medium 1512, the various control modules in accordance with embodiments of the present invention may also include related firmware and/or hardware components. Thus, the figure is exemplary only.

The control program 1522 may control the processor 1502. The processor 1502 may perform instructions of the control program 1522, and thereby operate in accordance with the methods described in detail herein. The control programs may be stored in a compressed, uncompiled and/or encrypted format. The control programs furthermore include program elements that may be necessary, such as an operating system, a database management system and device drivers for allowing the processor 1502 to interface with peripheral devices, databases, etc. Appropriate program elements are known to those skilled in the art, and need not be described in detail herein.

According to some embodiments, the instructions of the control program may be read into a main memory from another computer-readable medium, such as from the ROM 1516 to the RAM 1508. Execution of sequences of the instructions in the control program causes the processor 1502 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 1502, communication ports 1504, clock 1506, output device 1508, input device 1510, data storage device 1512, ROM 1516 and RAM 1508 may communicate or be connected directly or indirectly in a variety of ways. For example, the processor 1502, communication ports 1504, clock 1506, output device 1508, input device 1510, data storage device 1512, ROM 1516 and RAM 1508 may be connected via a bus 1534.

While specific implementations and hardware/software configurations for the computer 1500 have been illustrated, it should be noted that other implementations and hardware configurations are possible and that no specific implementation or hardware/software configuration is needed. Thus, not all of the components illustrated in FIG. 15 may be needed for the computer 1500 implementing the methods disclosed herein.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims, in the United States Patent Office Manual of Patent Examining Procedures.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described embodiments are intended to illustrate the principles of the invention, but not to limit the scope of the invention. Various other embodiments and modifications to these preferred embodiments may be made by those skilled in the art without departing from the scope of the present invention.

What is claimed is:

1. A telecommunications system, comprising:
   a presentation server;
   a plurality of user devices, each of the user devices associated with at least one conference participant of a plurality of conference participants and connected to the presentation server via a network; and
   wherein the presentation server receives a presentation; and
   wherein the presentation server receives at least one video feed from at least one of the conference participants; and
   wherein the presentation server applies a first transparency level of a first portion of the at least one received video feed and a second transparency level of a second portion of the at least one received video feed, the first transparency level and the second transparency level being adjustable independent of each other; and
   wherein the first transparency level adjusting how visible the first portion of the at least one received video feed of the mixed video presentation received from the presentation server is displayed to the conference participants and the second transparency level adjusting how visible the second portion of the at least one received video feed of the mixed video presentation received from the presentation server is displayed to the conference participants; and
   wherein the presentation server mixes the at least one received video feed with the received presentation to form a mixed video presentation; and
   wherein the presentation server provides the mixed video presentation to the plurality of user devices of the plurality of conference participants during a conference via the network.

2. The telecommunications system of claim 1 wherein the first portion of the at least one received video feed comprises a face of a conference participant that is currently speaking.

3. The telecommunications system of claim 1 wherein the first portion of the at least one received video feed comprises faces of all of the conference participants.

4. The telecommunications system of claim 1 wherein the presentation server applies the first transparency level and the second transparency level to the mixed video presentation based on a command received from a designated user device of the plurality of user devices and the presentation server provides the mixed video presentation with the first transparency level and the second transparency level to the user devices via the network.

5. The telecommunications system of claim 1 wherein the mixed video presentation being displayed on the user devices and the first transparency level and the second transparency level being adjustable by each of the user devices independent of the other user devices via a transparency control on each user device.

6. A telecommunications system, comprising:
   a presentation server;
   a plurality of user devices, each of the user devices associated with at least one of a plurality of conference participants and connected to the presentation server via a network, each one of the plurality of user devices having a transparency level control; and
   wherein the presentation server receives a presentation from a conference participant of the plurality of conference participants; and
   wherein the presentation server determines if there is a background in the received presentation; and
   wherein if the background is present in the received presentation, then the presentation server removes the background; and
   wherein the presentation server receives a video feed from a participant of the plurality of conference participants; and
   wherein the presentation server mixes the received video feed with the received presentation to form a mixed video presentation; and
   wherein the presentation server provides the mixed video presentation to the user devices via the network; and
   wherein a first transparency level of a first portion of the received video feed and a second transparency level of a second portion of the received video feed being adjustable by each of the user devices independent of the other user devices via the transparency level control of each user device;
   wherein adjustment of the first transparency level adjusting how visible the first portion of the at least one received video feed of the mixed video presentation received from the presentation server is displayed to the conference participants and the second transparency level adjusting how visible the second portion of the at least one received video feed of the mixed video presentation received from the presentation server is displayed to the conference participants, the first transparency level and the second transparency level being adjustable independent of each other.

7. The telecommunications system of claim 6 wherein the first portion of the video feed comprises a face of a currently speaking participant in the received video feed.

8. The telecommunications system of claim 6 wherein the first transparency level adjusting how visible an image of a currently speaking participant in the received video feed portion of the mixed video presentation received from the presentation server is displayed to the conference participants during a conference and wherein the second transparency level adjusting how visible an image of a remaining portion of the video feed in the received video feed portion of the mixed video presentation received from the presentation server is displayed to the conference participants during the conference.

9. A telecommunications method, comprising:
   uploading a presentation to a presentation server;
   receiving at least one video feed from a participant of a plurality of conference participants;
   mixing the at least one received video feed with the uploaded presentation to form a mixed video presentation;
   providing the mixed video presentation to a plurality of user devices, each of the user devices associated with at least one of the plurality of conference participants, each user device displaying the mixed video presentation to the at least one conference participant associated with the user device; and providing a first transparency level control and a second transparency level control, the first transparency level control controlling a first transparency level of a first portion of the at least one video feed in the mixed video presentation, the second transparency level control controlling a second transparency level of a second portion of the at least one video feed in the mixed video presentation; and wherein adjustment of the first transparency level adjusting how visible the first portion of the at least one received video feed of the mixed video presentation received from the presentation server is displayed during a conference and adjustment of the second transparency level adjusting how visible the second portion of the at least one received video feed of the mixed video presentation received from the presentation server is displayed during the conference, the first transparency level and the second transparency level being adjustable independent of each other.

10. The telecommunications method of claim 9 wherein adjustment of the first transparency level adjusting how visible an image of a currently speaking participant in the received video feed portion of the mixed video presentation received from the presentation server is displayed to the at least one conference participant during the conference and wherein adjustment of the second transparency level adjusting how visible an image of a remaining portion of the video feed in the received video feed portion of the mixed video presentation received from the presentation server is displayed to the at least one conference participant during the conference.

11. The telecommunications method of claim 9 wherein each user device of the plurality of user devices comprises the first transparency level control and the second transparency level control, the first transparency level and the second transparency level of each user device being adjustable independent of other user devices.

12. The telecommunications method of claim 9 further comprising identifying a face of a currently speaking conference participant, the first portion of the at least one received video feed comprising the face.

13. The telecommunications method of claim 9 further comprising identifying faces of all of the conference participants, the first portion of the video feed comprising the identified faces.

14. A telecommunications method, comprising:
uploading a presentation to a presentation server;
determining if there is a background in the uploaded presentation:
if the background is present in the uploaded presentation, then removing the background;
receiving a video feed from a currently speaking participant of the plurality of conference participants;
mixing the received video feed with the uploaded presentation to form a mixed video presentation;
providing the mixed video presentation to a plurality of user devices, each of the user devices associated with at least one of the plurality of conference participants, each user device displaying the mixed video presentation to the at least one conference participant associated with that user device; and providing a first transparency level control and a second transparency level control on each user device, the first transparency level control controlling a first transparency level of a first portion of the video feed in the mixed video presentation, the second transparency level control controlling a second transparency level of a second portion of the video feed in the mixed video presentation, the first transparency level and the second transparency level being adjustable independent of each other; and wherein adjustment of the first transparency level adjusting how visible the first portion of the received video feed of the mixed video presentation received from the presentation server is displayed and adjustment of the second transparency level adjusting how visible the second portion of the received video feed of the mixed video presentation received from the presentation server is displayed, the first transparency level and the second transparency level of each user device being adjustable independent of other user devices via the first transparency level control and the second transparency level control on each user device.

15. The telecommunications method of claim 14 wherein adjustment of the first transparency level adjusting visibility of an image of the currently speaking participant in the received video feed portion of the mixed video presentation and wherein adjustment of the second transparency level adjusting visibility of an image of a remaining portion of the received video feed portion of the mixed video presentation.

16. The telecommunications method of claim 14 further comprising identifying a face of the currently speaking conference participant, and wherein the first portion of the at least one received video feed is comprised of the face of the currently speaking conference participant.

17. The telecommunications method of claim 14 wherein the first transparency level control and the second transparency level control are provided such that a control window having a first window that displays the mixed video presentation prior to an adjustment of at least one of the first transparency level and the second transparency level to the at least one conference participant via the user device associated with the at least one conference participant and a second window that displays the mixed video presentation following an adjustment of at least one of the first transparency level and the second transparency level to the at least one conference participant via the user device associated with the at least one conference participant.

18. The telecommunications method of claim 14 further comprising identifying faces of all of the conference participants, and wherein the first portion of the video feed comprises the faces of all of the conference participants.

19. The telecommunications method of claim 14 further comprising applying the first transparency level or the second transparency level to the received video feed prior to mixing the received video feed with the uploaded presentation.

20. The telecommunication system of claim 1 wherein at least one of the server and the user devices recognize at least one face of a speaker during the conference and wherein the first portion of the at least one received video feed comprises the at least one recognized face.

* * * * *